United States Patent [19]

Taylor

[11] Patent Number: 5,416,626

[45] Date of Patent: May 16, 1995

[54] OPTICALLY AMPLIFIED TRANSMISSION SYSTEMS

[75] Inventor: Michael G. Taylor, Harlow, United Kingdom

[73] Assignee: Northern Telecom Limited, Montreal, Canada

[21] Appl. No.: 189,049

[22] Filed: Jan. 31, 1994

[30] Foreign Application Priority Data

Feb. 2, 1993 [GB] United Kingdom ............... 9302022

[51] Int. Cl.$^6$ ............................................ H04B 10/00
[52] U.S. Cl. ................................ 359/156; 359/161; 359/173
[58] Field of Search ............ 359/156, 122, 160–162, 359/173, 179, 181–182, 187, 189, 192, 195, 110–111, 341

[56] References Cited

U.S. PATENT DOCUMENTS

| | | | |
|---|---|---|---|
| 4,947,134 | 8/1990 | Olsson | 359/173 |
| 4,965,857 | 10/1990 | Auracher et al. | 359/181 |
| 5,023,949 | 6/1991 | Auracher et al. | 359/181 |
| 5,227,908 | 7/1993 | Henmi | 359/173 |
| 5,295,013 | 3/1994 | Ono | 359/156 |

FOREIGN PATENT DOCUMENTS

WO91/18455  11/1991  WIPO .

OTHER PUBLICATIONS

Olsson, "Lightwave Systems With Optical Amplifiers", Journal of Lightwave Technology, vol. 7, No. 7 Jul. 1989, pp. 1071–1082.

*Primary Examiner*—David K. Moore
*Assistant Examiner*—Kinfe-Michael Negash
*Attorney, Agent, or Firm*—Lee, Mann, Smith, McWilliams, Sweeney & Ohlson

[57] ABSTRACT

In an optically amplified transmission system including a concatenation of optical amplifiers in the transmission path between an optical transmitter and a non-coherent receiver, the transmitter includes, in addition to a modulator for impressing data modulation, a polarisation state modulator for improving the signal-to-noise ratio at the detector.

8 Claims, 2 Drawing Sheets

OPTICALLY AMPLIFIED TRANSMISSION SYSTEMS

BACKGROUND OF THE INVENTION

In an optically amplified transmission system employing non-coherent detection the optical transmission path between an optical transmitter and a receiver at some remote location includes a concatenation of optical amplifiers distributed at spaced intervals along that transmission path. Each of the optical amplifiers has a gain medium which has a population inversion. A low power input to such an amplifier is amplified to a higher power as it propagates through the gain medium. The signal input to the amplifier interacts with the population inversion to produce stimulated emission, thereby resulting in signal amplification. Additionally however, the population inversion will produce some spontaneous emission which is broad-band in comparison with the signal, and this spontaneous emission will also be amplified both in this, and in succeeding amplifiers. As a result, amplified spontaneous emission (ASE) arrives at the receiver together with the signal. It has been shown, for instance in a paper by N. A. Olsson entitled 'Lightwave Systems with Optical Amplifiers', Journal of Lightwave Technology, Vol. 7, No. 7, Jul. 1989, pp 1071–1082, that when the incoming signal is detected at the receiver, the ASE contributes a noise input as the result of signal-spontaneous beat interactions and a further noise input as the result of spontaneous-spontaneous beat interactions.

SUMMARY OF THE INVENTION

The present invention is directed to achieving reduced ASE and a consequent improvement on the signal-to-noise ratio of the signal detected at the receiver.

According to the present invention there is provided an optical data transmission system employing non-coherent detection, the system including an optical transmitter optically coupled with a non-coherent optical receiver by an optical transmission path that includes a concatenation of optical amplifiers, wherein the transmitter includes a data modulator adapted to impress data modulation upon an optical signal transmitted by the transmitter to the receiver, and wherein the transmitter additionally includes a second modulator, which second modulator is adapted to modulate between a pair of substantially orthogonally polarised states the state of polarisation of the optical signal transmitted by the transmitter.

It may be noted that the use of a second modulator adapted to modulate between substantially orthogonally polarised states the state of polarisation of a data modulated optical signal transmitted by a transmitter has been previously described in U.S. Pat. Nos. 4,965,857 and 5,023,494, but that disclosure is in the context of a system employing coherent (superheterodyne) detection. The coherent detection system described therein does not use optical amplifiers, and so is in no way concerned with any problems of ASE noise. Moreover the second modulator is specifically included to enable coherent detection, and so on the face of the document has no apparent relevance to systems employing non-coherent detection.

BRIEF DESCRIPTION OF THE DRAWINGS

There follows a description of optically amplified transmission systems embodying the invention in preferred forms. The description refers to the accompanying drawings in which.

DETAILED DESCRIPTION OF THE PREFERRED EMBODIMENTS

Figure 1:
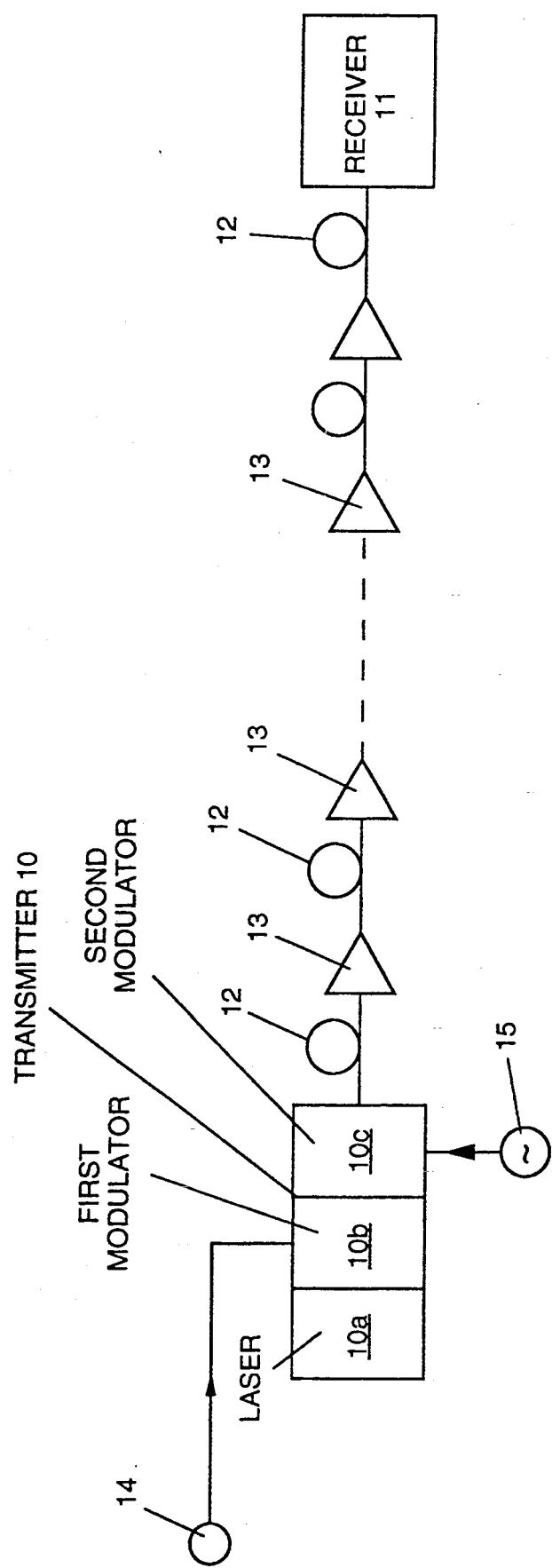
FIGS. 1 and 2, are block diagrams of optical transmission systems embodying the invention in alternative preferred forms.

The optical transmitter system of FIG. 1 has a transmitter 10, at a remote location a non-coherent receiver 11 and, between the two, an optical fibre transmission path 12 that includes a concatenation of optical amplifiers 13, typically of the order of a hundred amplifiers. A preferred form of amplifier is an optical fibre amplifier incorporating a rare-earth dopant such as erbium. A preferred form of transmitter 10 incorporates an injection laser source 10a, a first modulator 10b supplied with data from a data input 14, and a second modulator 10c fed from an oscillator 15. Typically, but not necessarily, the first modulator 10b is an intensity modulator. If the data is impressed as intensity modulation, the functions of laser source and intensity modulator may be combined in the same integer comprising an injection laser driven with both laser bias current and with data modulation current. The second modulator 10c is an optical state of polarisation modulator, and the amplitude of the output of the oscillator is sufficient to drive the second modulator so as to sweep its output between a pair of substantially orthogonally polarised polarisation states. A convenient form for such a polarisation modulator 10c is that of a lithium niobate phase shifter for which the state of polarisation of its optical input is arranged so that the input is divided substantially equally between its TE and its TM modes. Alternatively the modulator could, for instance operate by dividing the signal into two equal parts, frequency shifting one part by acoustic-optic modulation, and then arranging to recombine the two parts with orthogonal polarisation states.

It has generally been thought that ASE is unpolarised. Alternatively stated, it has generally been thought that the ASE power in the polarisation state orthogonal to the polarisation state of the signal power is equal to the ASE power in the same polarisation state as that of the signal power. However we have now observed experimentally that in respect of a long system there is in fact more ASE power orthogonal to the signal than in the same polarisation state as that of the signal. It is believed that this is due to a small discrepancy in gain between the two polarisation states at each amplifier. This small discrepancy is then multiplied by the number of amplifiers in the system, thereby giving rise to what can amount to a considerable discrepancy in, for instance, the case of a system including about a hundred concatenated amplifiers. It has been found that, by modulating the polarisation state of the signal so as to make it spend time in both of any two substantially orthogonally polarised states, the ASE is reduced and also the signal power is incremented.

The signal-to-ASE ratio, and hence also the received signal-to-noise ratio, is thereby improved. Clearly in order to maximise the improvement the modulation should be at a rate that is much faster than the response time of the population inversion in the amplifiers. If the polarisation modulation is at a rate short compared with the time constant of the population inversion then, at a single amplifier, the shortfall from total elimination of the gain discrepancy between the two polarisation states at this amplifier is correspondingly small. However, so far as the whole system is concerned, account must also be taken of the number of amplifiers in the system because there is a corresponding shortfall at each of the other amplifiers, with consequent cumulative effect. Assuming a population inversion time in respect of an erbium doped fibre amplifier of about 10 ms, it is seen that the polarisation modulation frequency for a hundred amplifier system, should preferably be in excess of 100 Khz. The polarisation modulation does not have to be periodic.

In FIG. 1, the polarisation modulator 10c has been represented as being located at, and forming part of, the transmitter 10, but it will be evident that it could in principle equally well be located immediately before the first amplifier of the concatenation. However to locate it after the first amplifier, or even further downstream the concatenation would involve the penalty that it would exercise no effect upon the ASE generated by the amplifier upstream of it.

The system is liable to have some net polarisation dependent loss (PDL), and hence, if the polarisation modulator 10c is allowed to operate to modulate the signal down the transmission path 12 between any random pair of substantially orthogonally polarised states, there is a risk that this polarisation modulation may be detected at the receiver as amplitude modulation. One way of avoiding this risk is accomplished in the transmission system of FIG. 2.

Figure 2:
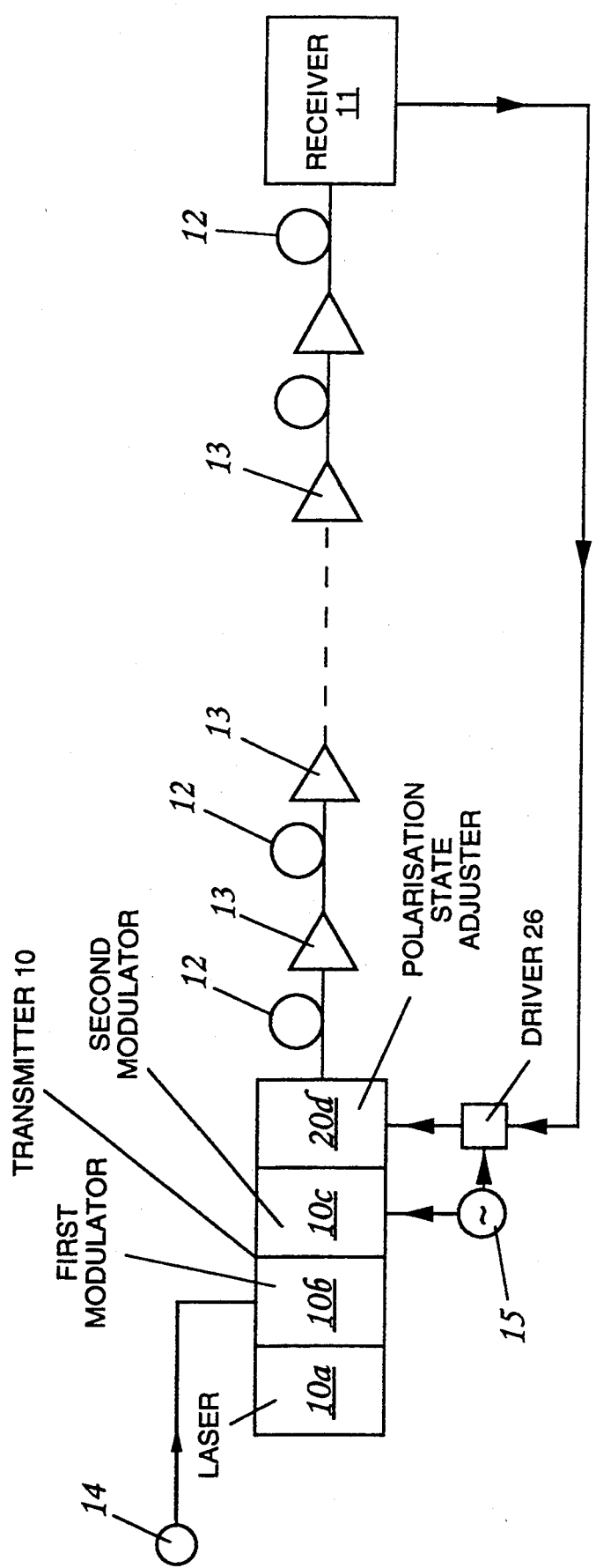

This transmission system of FIG. 2 has the same arrangement of receiver 11, transmission path 12, and amplifiers 13 as the system of FIG. 1. Similarly its transmitter 20 includes the same three elements of laser source 10a and first and second modulators 10b and 10c as the transmitter 10 of the system of FIG. 1. Additionally, the transmitter 20 of FIG. 2 includes a polarisation state adjuster 20d powered from a driver 26 that forms part of a feedback control loop. The polarisation adjuster is driven by the feedback loop to minimise the amplitude modulation appearing at the receiver's detector that has the same frequency as that of the modulation applied to the polarisation modulator 10c. If the polarisation modulator takes the form of a lithium niobate phase shifter, the polarisation adjuster may conveniently take the same form.

At least in respect of a digital intensity modulation transmission system an alternative solution to the potential problem of the polarisation dependent loss (PDL) is to dispense with the adjuster and feedback control loop and instead to modulate the polarisation at a rate faster than the bit rate, preferably at twice, or greater integral multiple of, the bit rate.

I claim:

1. An optical data transmission system employing non-coherent detection, the system including an optical transmitter optically coupled with a non-coherent optical receiver by an optical transmission path that includes a concatenation of optical amplifiers, wherein the transmitter includes a data modulator adapted to impress data modulation upon an optical signal transmitted by the transmitter to the receiver, and wherein the transmitter additionally includes a second modulator, which second modulator is optically in series with the first modulator and is adapted to modulate between a pair of substantially orthogonally polarised states the state of polarisation of the optical signal transmitted by the transmitter.

2. A data transmission system as claimed in claim 1, wherein the data modulator is adapted to impress data modulation in the form of intensity modulation.

3. A data transmission system as claimed in claim 1, wherein the second modulator is adapted to modulate at a frequency greater than that of said data modulation.

4. A data transmission system as claimed in claim 3, wherein the data modulator is adapted to impress data modulation in the form of intensity modulation.

5. A data transmission system as claimed in claim 3, wherein the second modulator is adapted to modulate at a frequency which is twice, or greater integral multiple of, the frequency of said data modulation.

6. A data transmission system as claimed in claim 5, wherein the data modulator is adapted to impress data modulation in the form of intensity modulation.

7. A data transmission system as claimed in claim 1, wherein the system includes a feedback control loop adapted to regulate the operation of a polarisation state adjuster located physically in series with the second modulator so as to minimise the component of the signal detected by the receiver that is at the same frequency as that of the modulation that is provided by the second modulator.

8. A data transmission system as claimed in claim 7, wherein the data modulator is adapted to impress data modulation in the form of intensity modulation.

* * * * *